(12) United States Patent
Sato et al.

(10) Patent No.: US 11,209,606 B2
(45) Date of Patent: Dec. 28, 2021

(54) OPTICAL FIBER UNIT AND OPTICAL FIBER CABLE

(71) Applicant: SUMITOMO ELECTRIC INDUSTRIES, LTD., Osaka (JP)

(72) Inventors: Fumiaki Sato, Osaka (JP); Hiroki Ishikawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/759,757

(22) PCT Filed: Nov. 2, 2018

(86) PCT No.: PCT/JP2018/040848
§ 371 (c)(1),
(2) Date: Apr. 28, 2020

(87) PCT Pub. No.: WO2019/088256
PCT Pub. Date: May 9, 2019

(65) Prior Publication Data
US 2021/0181451 A1 Jun. 17, 2021

(30) Foreign Application Priority Data
Nov. 2, 2017 (JP) .............................. JP2017-212767

(51) Int. Cl.
*G02B 6/44* (2006.01)
(52) U.S. Cl.
CPC ......... *G02B 6/4498* (2013.01); *G02B 6/4403* (2013.01); *G02B 6/443* (2013.01); *G02B 6/4409* (2013.01)

(58) Field of Classification Search
CPC ..... G02B 6/4403; G02B 6/448; G02B 6/4498
See application file for complete search history.

(56) References Cited

U.S. PATENT DOCUMENTS

| | | | |
|---|---|---|---|
| 5,720,908 A * | 2/1998 | Gaillard ............... | G02B 6/4403 174/117 F |
| 10,185,105 B2 * | 1/2019 | Risch ..................... | G02B 6/448 |
| 10,409,017 B2 * | 9/2019 | Chiasson ............... | G02B 6/443 |
| 2011/0110635 A1 * | 5/2011 | Toge ...................... | G02B 6/441 385/102 |
| 2012/0114292 A1 | 5/2012 | Hoover et al. | |

(Continued)

FOREIGN PATENT DOCUMENTS

CN 104808303 A 7/2015
EP 2770357 A1 8/2014
(Continued)

*Primary Examiner* — Daniel Petkovsek
(74) *Attorney, Agent, or Firm* — Faegre Drinker Biddle & Reath LLP

(57) ABSTRACT

The present disclosure includes: an optical fiber ribbon including a plurality of optical fibers having an outer diameter of 0.2 mm or less and a ribbon resin that integrates the plurality of optical fibers in a parallel state; and a coating resin that covers the optical fiber ribbon. The optical fiber ribbon is in an assembled form in which the plurality of optical fibers are assembled so that a length in an arrangement direction is shorter than that of a case where the optical fibers are arranged in a row, and the optical fiber ribbon is covered with the coating resin in the assembled form.

7 Claims, 6 Drawing Sheets

(56) References Cited

U.S. PATENT DOCUMENTS

| | | | |
|---|---|---|---|
| 2015/0192748 A1* | 7/2015 | Sato .................... | G02B 6/4405 |
| | | | 385/114 |
| 2016/0161692 A1 | 6/2016 | Namazue et al. | |
| 2017/0031121 A1* | 2/2017 | Blazer .................. | G02B 6/4434 |
| 2017/0115461 A1 | 4/2017 | Namazue et al. | |
| 2017/0184803 A1 | 6/2017 | Namazue et al. | |
| 2017/0285285 A1 | 10/2017 | Hoshino et al. | |
| 2019/0204519 A1 | 7/2019 | Sato et al. | |

FOREIGN PATENT DOCUMENTS

| | | |
|---|---|---|
| JP | H05-019150 A | 1/1993 |
| JP | 2001-350069 A | 12/2001 |
| JP | 2005-062427 A | 3/2005 |
| JP | 2010-170007 A | 8/2010 |
| JP | 2012-234122 A | 11/2012 |
| JP | 2013-88617 A | 5/2013 |
| JP | 2014-202795 A | 10/2014 |
| JP | 2015-052704 A | 3/2015 |
| KR | 2000-0047101 A | 7/2000 |
| WO | WO-2016-042785 A1 | 3/2016 |
| WO | WO-2017-145955 A1 | 8/2017 |

\* cited by examiner

OPTICAL FIBER UNIT AND OPTICAL FIBER CABLE

TECHNICAL FIELD

The present disclosure relates to an optical fiber unit and an optical fiber cable.

This present application claims priority from Japanese Patent Application No. 2017-212767 filed on Nov. 2, 2017, the content of which is hereby incorporated by reference into this application.

BACKGROUND ART

Patent Literature 1 discloses an optical fiber cable including an optical fiber ribbon, in which an optical fiber ribbon resin is divided at a division part intermittently provided along a longitudinal direction of the optical fiber ribbon and the optical fiber ribbon resin remains at a non-division part.

Patent Literature 2 discloses an optical fiber ribbon using a multi-core optical fiber having a plurality of cores, and an optical cable (optical fiber cable) in which the optical fiber ribbon is housed.

Patent Literature 3 discloses an intermittently connected optical fiber ribbon in which an outer diameter size of an optical fiber (colored optical fiber) is set to 220 µm or less and a distance between centers of adjacent optical fibers is set to 250±30 µm.

CITATION LIST

Patent Literature

Patent Literature 1: JP-A-2005-62427
Patent Literature 2: JP-A-2015-52704
Patent Literature 3: JP-A-2013-88617

SUMMARY OF INVENTION

An optical fiber unit according to one aspect of the present disclosure includes: an optical fiber ribbon including a plurality of optical fibers having an outer diameter of equal to or smaller than 0.2 mm and a ribbon resin that integrates the plurality of optical fibers in a parallel state; and a coating resin that covers the optical fiber ribbon. The optical fiber ribbon is in an assembled form in which the plurality of optical fibers are assembled so that a length in an arrangement direction is shorter than that of a case where the optical fibers are arranged in a row, and the optical fiber ribbon is covered with the coating resin in the assembled form.

An optical fiber cable according to one aspect of the present disclosure includes the optical fiber unit. The optical fiber unit is covered with a tube.

An optical fiber cable according to one aspect of the present disclosure includes: the optical fiber unit; and a slot rod including a slot groove. The optical fiber unit is housed in the slot groove.

DESCRIPTION OF EMBODIMENTS

Figure 1:
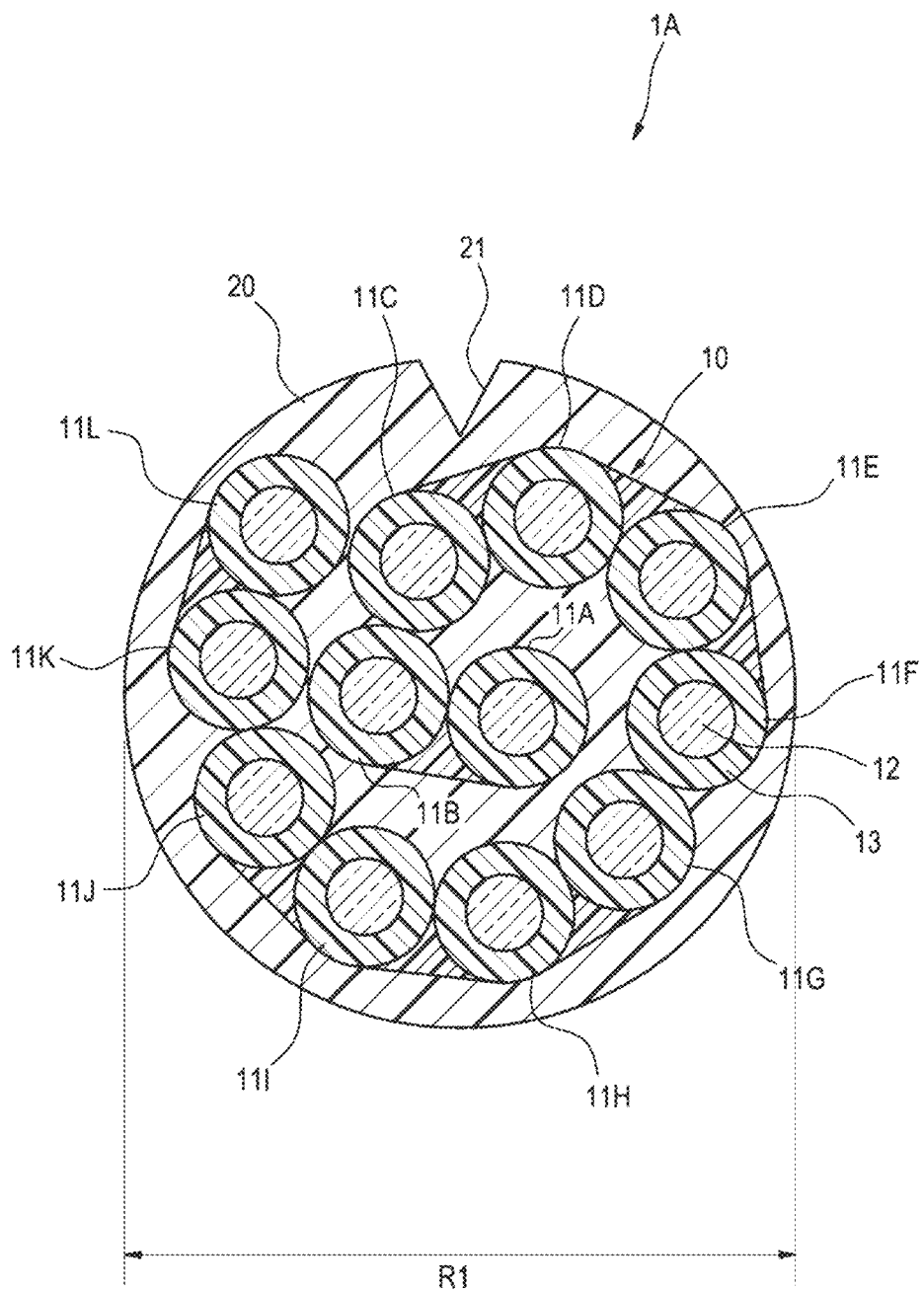
FIG. 1 is a cross-sectional view illustrating a configuration of an optical fiber unit according to a first embodiment.

Problem to be Solved by the Present Disclosure

For example, when the intermittently connected optical fiber ribbon as in Patent Literatures 1 and 3 is used, since optical fibers can be mounted on an optical fiber cable in a state where the optical fibers are assembled, high-density mounting of the optical fibers is easily performed on the optical fiber cable.

Meanwhile, as a diameter of the optical fiber is reduced, side pressure characteristics of the optical fiber ribbon tend to deteriorate. In a process of mounting the optical fiber ribbon on the optical fiber cable, a possibility that the optical fiber is disconnected increases.

On the other hand, for example, when the diameter of the optical fiber is reduced as in Patent Literature 3, the high density can be achieved, but it becomes difficult to identify the optical fibers and thus there is a possibility that wrong optical fibers are connected to each other at the time of connection. For example, the high density can be also achieved by using the multi-core optical fiber as in Patent Literature 2, but an expensive special article such as a fan-out code that perform splitting in order to identify an individual optical fiber is required when a cable terminal is connected to another cable.

An object of the present disclosure is to provide an optical fiber unit and an optical fiber cable capable of easily identifying an optical fiber without causing deterioration of side pressure resistance even though the optical fiber has a small diameter.

Effect of the Present Disclosure

According to the present disclosure, it is possible to easily identify an optical fiber without causing deterioration of side pressure resistance even though the optical fiber has a small diameter.

Description of Embodiments of the Present Disclosure

First, embodiments of the present disclosure will be described.

(1) An optical fiber unit according to one aspect of the present disclosure includes: an optical fiber ribbon including a plurality of optical fibers having an outer diameter of equal to or smaller than 0.2 mm and a ribbon resin that integrates the plurality of optical fibers in a parallel state; and a coating resin that covers the optical fiber ribbon. The optical fiber ribbon is in an assembled form in which the plurality of optical fibers are assembled so that a length in an arrangement direction is shorter than that of a case where the optical fibers are arranged in a row, and the optical fiber ribbon is covered with the coating resin in the assembled form.

According to the configuration, even though the outer diameter of the optical fiber is a small diameter of equal to or smaller than 0.2 mm, since the optical fiber ribbon is covered with the coating resin, it is possible to easily identify the optical fiber without causing deterioration of side pressure resistance of the optical fiber unit. Since the optical fiber ribbon is not exposed and covered with the coating resin, when performing the work of laying the optical fiber unit or mounting the optical fiber unit on the optical fiber cable, a possibility of causing damage to the optical fiber ribbon is reduced, and thus a risk of disconnection can be reduced.

(2) Young's modulus of the coating resin may be equal to or smaller than 100 MPa.

According to the configuration, since the Young's modulus of the coating resin is equal to or smaller than 100 MPa, the coating resin is soft and a cushion function is obtained. Accordingly, the deterioration of the side pressure resistance of the optical fiber unit can be further surely prevented.

(3) The core density per unit cross-sectional area of the optical fiber unit may be equal to or larger than 10 cores/$mm^2$.

According to the configuration, the optical fiber unit having high density can be formed by setting the core density per unit cross-sectional area of the optical fiber unit to equal to or larger than 10 cores/$mm^2$.

(4) The coating resin may cover the optical fiber ribbon in a solid state.

According to the configuration, since the coating resin covers the optical fiber ribbon in the solid state, the optical fiber is hard to move, the deterioration of the side pressure resistance can be further surely prevented, and the optical fiber is hard to be damaged.

(5) The coating resin may include a notch part for tearing.

According to the configuration, since the notch part for tearing is provided, it becomes easy to take out the optical fiber ribbon when the internal optical fiber ribbon is taken out such as the connection work of the optical fiber unit.

(6) The ribbon resin may be applied only to one surface of the optical fiber ribbon. According to the configuration, since the optical fiber ribbon is easily bent to the side where the ribbon resin is not applied, it is easy to form the optical fiber ribbon into the assembled form. Since the ribbon resin is applied only to one side, the optical fiber unit having high density can be formed.

(7) An optical fiber cable according to one aspect of the present disclosure includes the optical fiber unit according to any one of (1) to (6). The optical fiber unit is covered with a tube.

According to the configuration, in the optical fiber cable in which the optical fiber unit is covered with the tube, even though the optical fiber has a small diameter, the side pressure resistance does not deteriorate, and the optical fiber can be easily identified. The disconnection of the optical fiber is hard to occur.

(8) An optical fiber cable according to one aspect of the present disclosure includes the optical fiber unit according to any one of (1) to (6), and a slot rod including a slot groove. The optical fiber unit is housed in the slot groove.

According to the configuration, in the optical fiber cable in which the optical fiber unit is housed in the slot groove, even though the optical fiber has a small diameter, the side pressure resistance does not deteriorate, and the optical fiber can be easily identified. The disconnection of the optical fiber is hard to occur.

Details of Embodiments of the Present Disclosure

Specific examples of an optical fiber unit and an optical fiber cable according to embodiments of the present disclosure will be described hereinafter with reference to the drawings.

The present disclosure is not limited to the following examples and is intended to include meanings equivalent to the scope of the claims described in the scope of the claims and all the modifications within the scope.

First Embodiment

FIG. 1 is a cross-sectional view perpendicular to a length direction of an optical fiber unit 1A according to a first embodiment. As illustrated in FIG. 1, the optical fiber unit 1A includes an optical fiber ribbon 10 and a coating resin 20 that covers the periphery of the optical fiber ribbon 10.

In the optical fiber ribbon 10, a plurality (twelve pieces in this example) of optical fibers 11 (11A to 11L in this example) are connected to each other by a resin in a parallel state in which at least some parts thereof are in contact with each other. The optical fiber ribbon 10 forming the optical fiber unit 1A is formed into an assembled form in which a plurality of optical fibers 11A to 11L are assembled (for example, assembled in a round shape) in a cross-sectional view so that a length in an arrangement direction is shorter than that of a case where twelve pieces of the optical fibers 11A to 11L are arranged in a row. Each of the optical fibers 11A to 11L includes a glass fiber 12 and a coating layer 13 that covers the glass fiber 12.

The coating resin 20 is provided to cover the periphery of the optical fiber ribbon 10 in a solid state. The "solid state" indicates a state in which the coating resin 20 is filled so that there is no space around each of the optical fibers 11A to 11L in the optical fiber ribbon 10 in the assembled form as described above. Therefore, the periphery of the optical fiber ribbon 10 of the optical fiber unit 1A is protected by the coating resin 20 filled in the solid state, and the optical fiber ribbon 10 thereof is housed in a state of being held at a predetermined position to some extent.

The coating resin 20 is formed so that an outer shape thereof is, for example, a circular shape. For example, the coating resin 20 has Young's modulus of 100 MPa or less. Therefore, a shape of the optical fiber unit 1A is configured to be deformable. The coating resin 20 is formed of, for example, an ultraviolet curing type resin and a thermosetting type resin. The optical fiber unit 1A is formed so that an outer diameter R1 thereof is formed to be, for example, about 0.9 mm. For example, the coating resin 20 is colored or marked. A notch part 21 which is a notch for tearing is formed at an outer peripheral part of the coating resin 20. A foamed resin may be used as the coating resin 20.

In the optical fiber unit 1A illustrated in FIG. 1, one optical fiber ribbon 10 is covered with the coating resin 20 to form one unit, and for example, a unit may be formed by covering a plurality of optical fiber ribbons with the coating resin. The number of the optical fibers forming the optical fiber ribbon is not limited to twelve pieces. The core density per unit cross-sectional area of the optical fiber unit 1A may be, for example, 10 cores/$mm^2$ or more. A high-density optical fiber unit can be formed by setting the core density to 10 cores/$mm^2$ or more.

Second Embodiment

Figure 2:
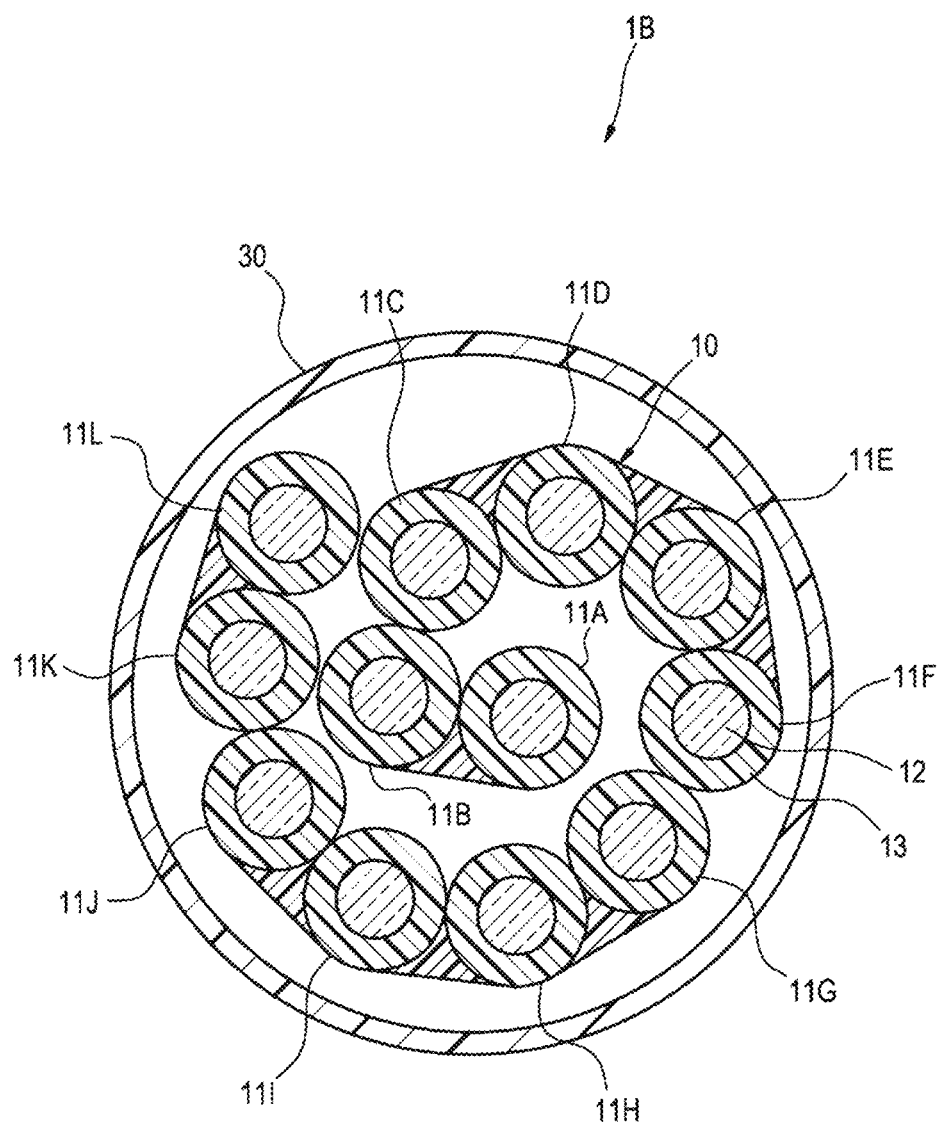
FIG. 2 is a cross-sectional view illustrating a configuration of an optical fiber unit according to a second embodiment.

FIG. 2 is a cross-sectional view perpendicular to a length direction of an optical fiber unit 1B according to a second embodiment. As illustrated in FIG. 2, the optical fiber unit 1B includes an optical fiber ribbon 10 and a coating resin 30 that covers the periphery of the optical fiber ribbon 10.

Since the optical fiber ribbon 10 has the same configuration as that of the optical fiber ribbon 10 of the first embodiment, the description thereof will be omitted.

The coating resin 30 is provided to cover the periphery of the optical fiber ribbon 10 in a hollow state. The "hollow state" indicates a state in which an outer periphery of an assembled outer shape of the optical fiber ribbon 10 in the above-described assembled form is covered with a layer-shaped resin and the inside of the layer-shaped resin is hollow. Therefore, the optical fiber ribbon 10 of the optical fiber unit 1B is housed in a state of being able to move inside the covering resin 30 in the hollow state.

Other configurations of the coating resin 30 are the same as those of the coating resin 20 of the first embodiment. The core density and the outer diameter of the optical fiber unit 1B are the same as those of the optical fiber unit 1A, but are in the hollow state, such that the core density can be made higher than that of the optical fiber unit 1A of the first embodiment.

Figure 3:
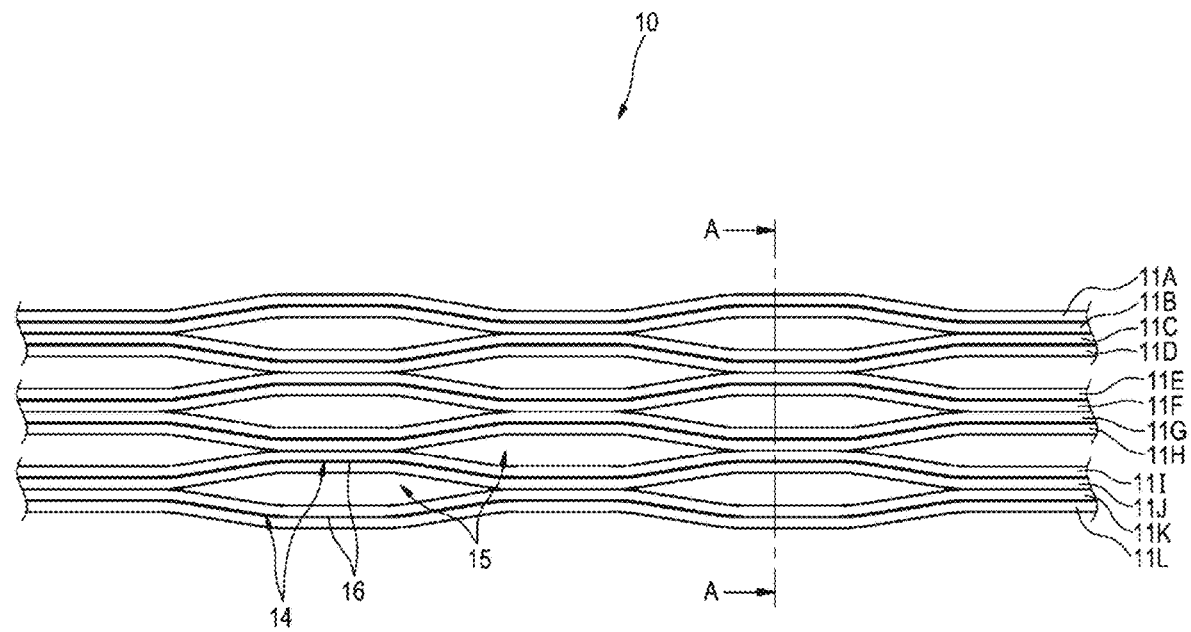
FIG. 3 is a plan view illustrating an example of an optical fiber ribbon housed in the optical fiber unit.
Figure 4:
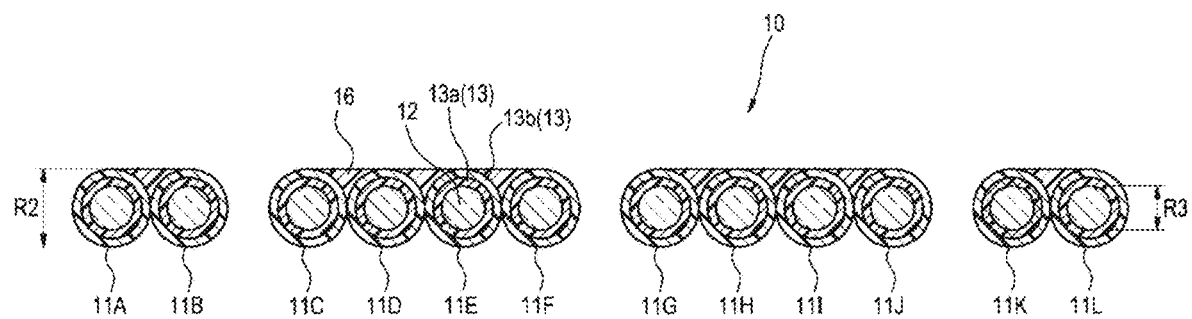
FIG. 4 is a cross-sectional view taken along the line A-A of the optical fiber ribbon illustrated in FIG. 3.

FIGS. 3 and 4 illustrate an example of the optical fiber ribbon 10 housed in the optical fiber units 1A and 1B. The optical fiber ribbon 10 is an intermittently connected optical fiber ribbon in which a connection part 14 in which adjacent optical fibers are connected to each other and a non-connection part 15 in which adjacent optical fibers are not connected to each other are intermittently provided in a longitudinal direction in a state where the plurality of optical fibers are disposed in parallel.

In the optical fiber ribbon 10 in this example, twelve pieces of the optical fibers 11A to 11L are provided. FIG. 3 illustrates an intermittently connected optical fiber ribbon in a state where the optical fibers 11A to 11L are opened in an arrangement direction. A part where the connection part 14 and the non-connection part 15 are intermittently provided may be provided between some optical fibers as illustrated in FIG. 3 or may be provided between all the optical fibers. In the example illustrated in FIG. 3, the non-connection part 15 is not provided between the optical fibers 11A and 11B, 11C and 11D, 11E and 11F, 11G and 11H, 11I and 11J, and 11K and 11L.

The connection part 14 in the optical fiber ribbon 10 is formed by applying, for example, a ribbon resin 16 made of an ultraviolet curing type resin and a thermosetting type resin between the optical fibers. By applying the ribbon resin 16 between the predetermined optical fibers, the connection part 14 and the non-connection part 15 are intermittently provided, and the respective optical fibers 11A to 11L are integrated in a parallel state. In the present example, as illustrated in FIG. 4, the ribbon resin 16 is applied to only one surface of the optical fibers 11A to 11L.

The optical fiber ribbon 10 may be manufactured, for example, such that the ribbon resin 16 is applied to one surface or all the both surfaces of the optical fibers 11A to 11L disposed in parallel, all the optical fibers 11A to 11L are connected to each other, and the non-connection part 15 is formed by cutting a part with a rotary blade. Alternatively, an optical fiber ribbon including a configuration in which the ribbon resin 16 is applied to one surface or both surfaces of the optical fibers 11A to 11L disposed in parallel and the non-connecting part 15 is not formed may be used.

The optical fibers 11A to 11L is formed with, for example, a glass fiber 12 formed of a core and a clad, and a coating layer including two layers (an inner coating layer 13a and an outer coating layer 13b) that cover the glass fiber 12. An outer diameter R2 of the optical fiber 11 is 0.2 mm or less, and for example, the outer diameter R2 of the optical fiber 11 may be formed to be 0.165 mm and an outer diameter R3 of the glass fiber 12 may be formed to be 0.100 mm. The optical fibers 11A to 11L have coating layers colored or marked in colors different from each other so that the optical fibers can be identified from each other.

In the optical fiber unit 1A according to the first embodiment, the optical fibers 11A to 11L forming the optical fiber ribbon 10 are formed into the assembled form as described above and covered with the coating resin 20. Thus, even though the outer diameter of the optical fibers 11A to 11L is a small diameter of, for example, 0.2 mm or less, since the optical fiber ribbon 10 is covered with the coating resin 20, the side pressure resistance of the optical fiber ribbon 10 does not deteriorate and the optical fibers 11A to 11L can be easily identified.

Since the optical fiber ribbon 10 is not exposed and covered with the coating resin 20, a possibility of causing damage to the optical fiber ribbon 10 is reduced and thus a risk of disconnection can be reduced when performing the work of laying the optical fiber unit 1A and the work of mounting the optical fiber unit 1A on the optical fiber cable.

Figure 5:
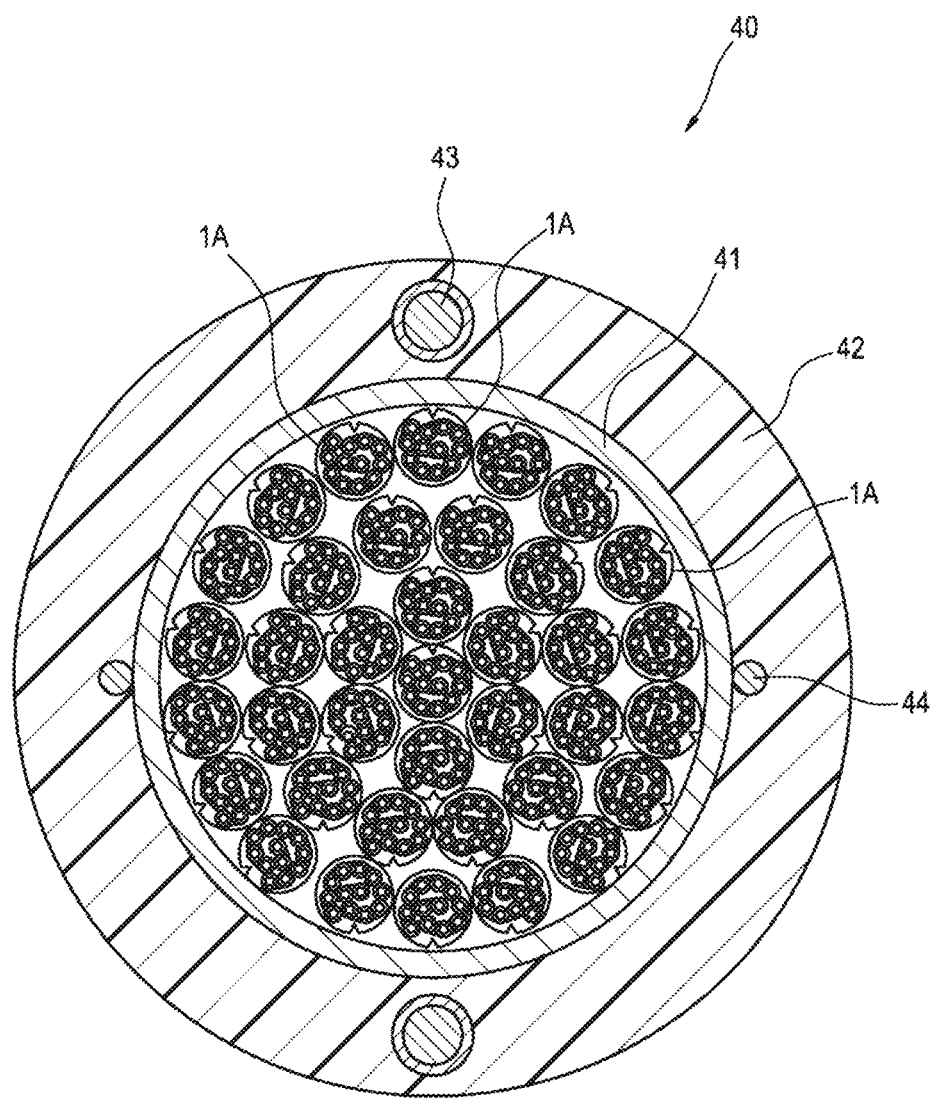
FIG. 5 is a cross-sectional view of a tube-type optical fiber cable in which the optical fiber unit is housed.

FIG. 5 illustrates an example of a tube-type optical fiber cable in which the optical fiber unit is housed in the tube. As illustrated in FIG. 5, the optical fiber cable 40 includes a cylindrical tube 41 and a plurality of optical fiber units 1A according to the first embodiment housed in the tube 41. The optical fiber cable 40 includes a jacket 42 that covers the periphery of the tube 41.

For example, each of the optical fiber units 1A is differently marked. The tube 41 is formed of a resin such as, for example, polybutylene terephthalate (PBT) and high-density polyethylene (HDPE). A tension member 43 and a tear string 44 are provided in the jacket 42. In the optical fiber cable 40 illustrated in FIG. 5, the optical fiber unit 1A is housed in the tube 41, and for example, the optical fiber unit 1B according to the second embodiment may be housed therein.

According to the optical fiber cable 40 including such a configuration, since the optical fiber unit 1A or 1B is used, the side pressure resistance of the optical fiber ribbon 10 does not deteriorate even though the optical fibers 11A to 11L forming the optical fiber ribbon 10 have a small diameter. It is possible to improve the identifiability between the optical fiber units 1A and 1B and the optical fibers 11A to 11L. Since the coating resin 20 is formed of a soft resin, the outer diameter of the optical fiber unit 1A can be deformed and the optical fiber unit 1A can be housed in the tube 41 with high density. The disconnection of the optical fiber is hard to occur.

Figure 6:
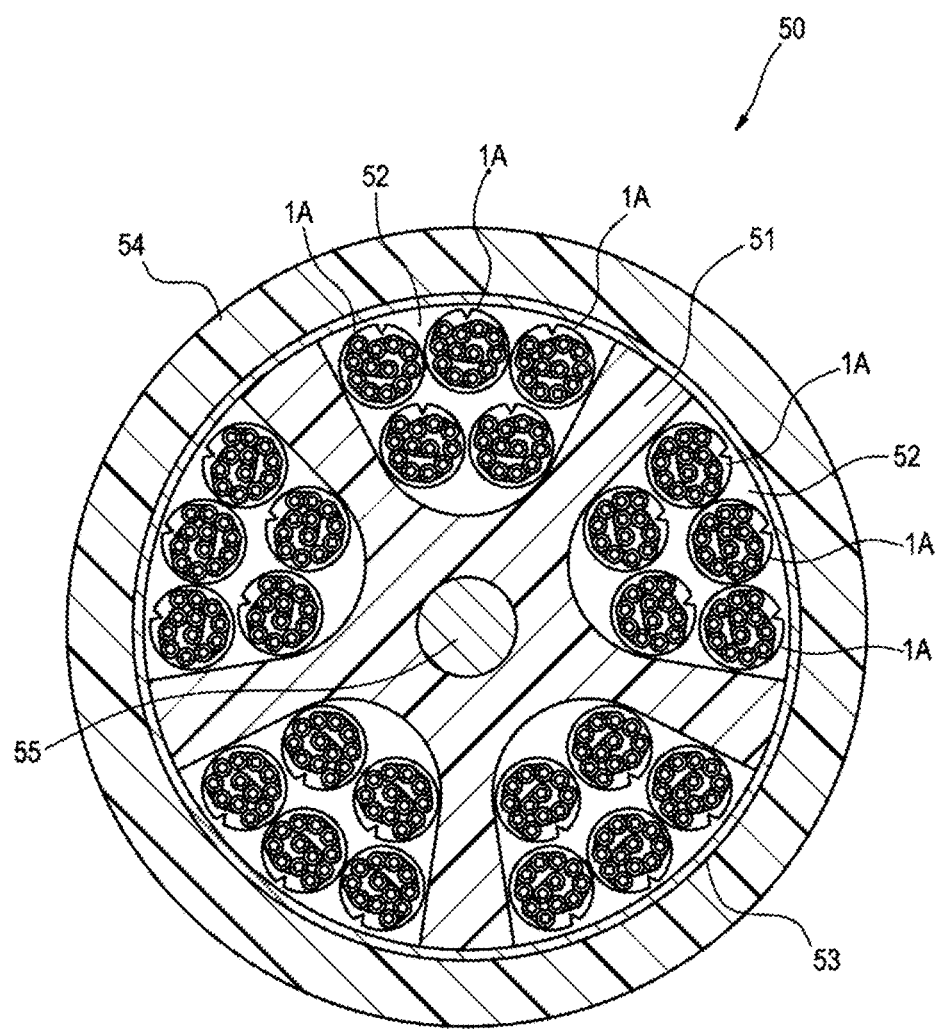
FIG. 6 is a cross-sectional view of a slot-type optical fiber cable in which the optical fiber unit is housed.

FIG. 6 illustrates an example of a slot-type optical fiber cable in which the optical fiber unit is housed in a slot groove. As illustrated in FIG. 6, an optical fiber cable 50 includes: a slot rod 51 having a plurality of (four grooves in this example) slot grooves 52 formed on an outer peripheral surface; and a plurality (5 optical fiber units in this example) of optical fiber units 1A according to the first embodiment housed in the slot groove 52. The optical fiber cable 50 includes a press-winding tape 53 wound around the slot rod 51 and a jacket 54 that covers the periphery of the press-winding tape 53.

For example, each of the optical fiber units 1A is differently marked. The slot groove 52 is formed, for example, in a spiral shape along a longitudinal direction of the optical fiber cable 50. A tension member 55 is provided at a center part of the slot rod 51. In the optical fiber cable 50 illustrated in FIG. 6, the optical fiber unit 1A is housed in the slot groove 52, and for example, the optical fiber unit 1B according to the second embodiment may be housed therein.

Even in the case of the optical fiber cable 50 including such a configuration, the same effect as that of the optical fiber cable 40 is obtained.

Figure 7:
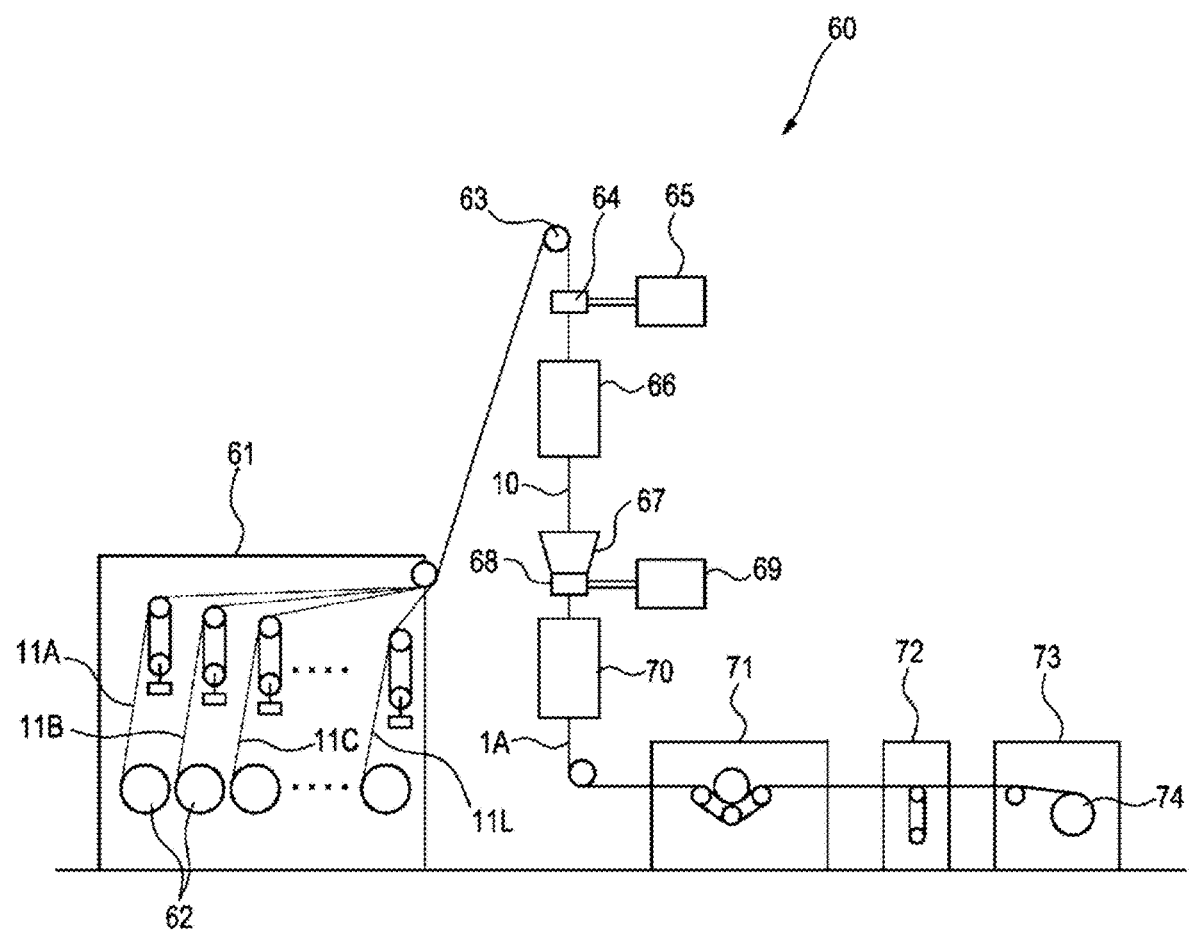
FIG. 7 is a diagram illustrating an example of a manufacturing apparatus of the optical fiber unit.

Next, a manufacturing method of the optical fiber unit 1A will be described with reference to FIG. 7.

In a manufacturing apparatus 60 of the optical fiber unit 1A, first, a plurality of optical fibers 11A to 11L fed from a reel 62 of a supply 61 are disposed in parallel by a line concentration roller 63.

Next, in an application apparatus 64, an ultraviolet curing type ribbon resin 16 supplied from a resin storage tank 65 is intermittently applied to, for example, one surface of a parallel surface formed by the optical fibers 11A to 11L disposed in parallel. Next, an ultraviolet irradiation apparatus 66 irradiates the ribbon resin 16 with ultraviolet rays and cures it, thereby manufacturing the integrated intermittently connected optical fiber ribbon 10.

Next, in an assembly apparatus (for example, a nipple including a round hole through which the intermittently connected optical fiber ribbon 10 passes) 67, the intermittently connected optical fiber ribbons 10 are formed in an assembled form so that a length in an arrangement direction is shorter than that of a case where the intermittently connected optical fiber ribbons 10 are arranged in a row. Next, in a coating apparatus (for example, a die including a round hole through which the intermittently connected optical fiber ribbon 10 formed in the assembled form as described above passes) 68, the ultraviolet curing type coating resin 20 supplied from a resin storage tank 69 is extruded and coated around the optical fiber ribbon 10 in the assembled form in a solid state. Next, an ultraviolet irradiation apparatus 70 irradiates the coating resin 20 with ultraviolet rays and cures it, thereby manufacturing the optical fiber unit 1A.

Next, the optical fiber unit 1A is taken up by a delivery capstan 71 and wound up on a reel 74 by a winding apparatus 73 via a winding tension control dancer 72.

The process of coating the coating resin 20 around the optical fiber ribbon 10 may be performed in a process different from the process of applying the ribbon resin 16 to the optical fibers 11A to 11L. When a foamed resin is used as the coating resin 20, the assembled optical fiber ribbon 10 may be passed through an extruder for a thermoplastic resin and the optical fiber unit may be manufactured. The manufacturing may be performed by using a horizontal type manufacturing apparatus.

As described above, while the present disclosure is described in detail or with reference to specific embodiments, it is apparent to those skilled in the art that various modifications and corrections can be made without departing from the spirit and scope of the present disclosure. The number, position, and shape of the component members described above are not limited to the embodiments, and can be changed to the number, position, and shape suitable for performing the present disclosure.

REFERENCE SIGNS LIST 1A, 1B: optical fiber unit
10: optical fiber ribbon
11A to 11L: optical fiber
12: glass fiber
13: coating layer
14: connection part
15: non-connection part
16: ribbon resin
20, 30: coating resin
21: notch part
40, 50: optical fiber cable
41: tube
42, 54: jacket
52: slot groove
60: manufacturing apparatus

The invention claimed is:

1. An optical fiber unit, comprising:
an optical fiber ribbon including a plurality of optical fibers having an outer diameter of equal to or smaller than 0.2 mm and a ribbon resin that integrates the plurality of optical fibers in a parallel state; and
a coating resin that covers the optical fiber ribbon, wherein
the optical fiber ribbon is in a rolled form in which the plurality of optical fibers are assembled so that a length in an arrangement direction is shorter than when the optical fiber ribbon is in a flat form,
the optical fiber ribbon is covered with the coating resin in the rolled form, and
the coating resin covers the optical fiber ribbon in a solid state.

2. The optical fiber unit according to claim 1, wherein Young's modulus of the coating resin is equal to or smaller than 100 MPa.

3. The optical fiber unit according to claim 1, wherein the core density per unit cross-sectional area of the optical fiber unit is equal to or larger than 10 cores/mm$^2$.

4. The optical fiber unit according to claim 1, wherein the coating resin includes a notch part for tearing.

5. The optical fiber unit according to claim 1, wherein the ribbon resin is applied only to one surface of the optical fiber ribbon.

6. An optical fiber cable, comprising:
the optical fiber unit according to claim 1, wherein the optical fiber unit is covered with a tube.

7. An optical fiber cable, comprising:
the optical fiber unit according to claim 1; and
a slot rod including a slot groove, wherein
the optical fiber unit is housed in the slot groove.

* * * * *